(12) United States Patent
Choudhary et al.

(10) Patent No.: US 6,990,296 B2
(45) Date of Patent: Jan. 24, 2006

(54) OPTICAL PHASE MODULATION

(75) Inventors: Seemant Choudhary, Dallas, TX (US); Takeshi Hoshida, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 778 days.

(21) Appl. No.: 10/028,658

(22) Filed: Dec. 21, 2001

(65) Prior Publication Data
US 2003/0118352 A1 Jun. 26, 2003

(51) Int. Cl.
*H04B 10/04* (2006.01)

(52) U.S. Cl. .................... 398/188; 398/183

(58) Field of Classification Search ........... 398/183, 398/188
See application file for complete search history.

(56) References Cited

U.S. PATENT DOCUMENTS

| | | | |
|---|---|---|---|
| 5,253,309 A | 10/1993 | Nazarathy et al. | 385/4 |
| 5,416,628 A | 5/1995 | Betti et al. | 359/181 |
| 5,420,868 A | 5/1995 | Chraplyvy et al. | 370/122 |
| 5,515,196 A | 5/1996 | Kitajima et al. | 359/180 |
| 5,541,755 A | 7/1996 | Noe et al. | 359/110 |
| 5,602,669 A | 2/1997 | Chaki | 359/181 |
| 5,828,477 A | 10/1998 | Nilsson et al. | 359/181 |
| 5,953,139 A | 9/1999 | Nemecek et al. | 359/124 |
| 5,973,812 A | 10/1999 | Imai et al. | 359/161 |
| 6,005,702 A | 12/1999 | Suzuki et al. | 359/183 |
| 6,097,525 A | 8/2000 | Ono et al. | 359/181 |
| 6,118,566 A | 9/2000 | Price | 359/181 |
| 6,163,394 A | 12/2000 | Webb | 359/181 |
| 6,271,950 B1 * | 8/2001 | Hansen et al. | 398/154 |
| 2001/0005271 A1 | 6/2001 | Leclerc et al. | 359/140 |

FOREIGN PATENT DOCUMENTS

| | | |
|---|---|---|
| EP | 0 792 069 A2 | 1/1997 |
| EP | 0 825 733 A2 | 2/1998 |
| JP | 10-332939 | 12/1998 |

OTHER PUBLICATIONS

PCT Search Report in International Application No. PCT/IB 02/05568, dated Apr. 25, 2003, 7 pages.

* cited by examiner

*Primary Examiner*—Jason Chan
*Assistant Examiner*—Christina Y Leung
(74) *Attorney, Agent, or Firm*—Baker Botts L.L.P.

(57) ABSTRACT

An optical modulator provides for preceding of a high data rate phase modulated optical signal. According to one embodiment, the modulator includes a first phase modulator and a second phase modulator. The first phase modulator modulates an optical carrier signal according to a first data signal to generate a modulated optical signal. The second phase modulator modulates the modulated optical signal according to a time delayed version of its optical output signal. According to another embodiment, the modulator electrically precodes multiple data streams and modulates the precoded data streams using a series of phase modulators to generate a precoded optical data signal.

13 Claims, 3 Drawing Sheets

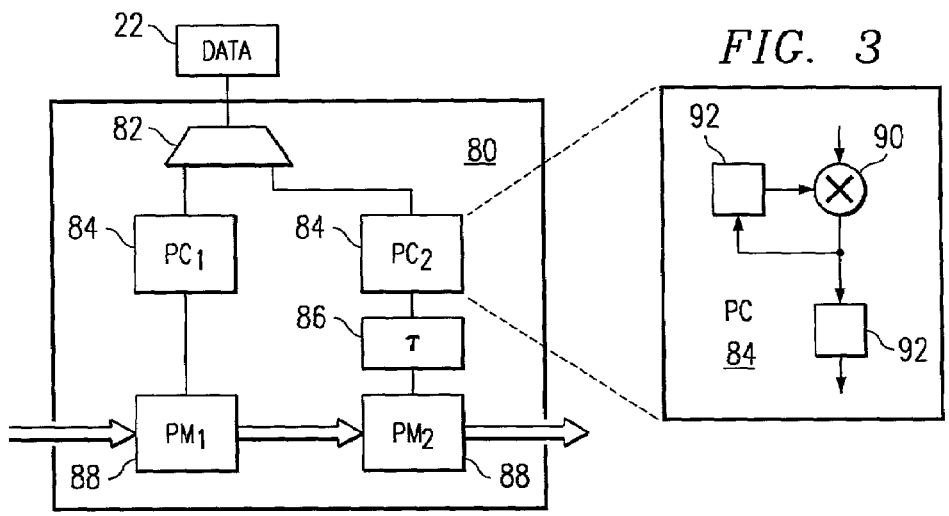
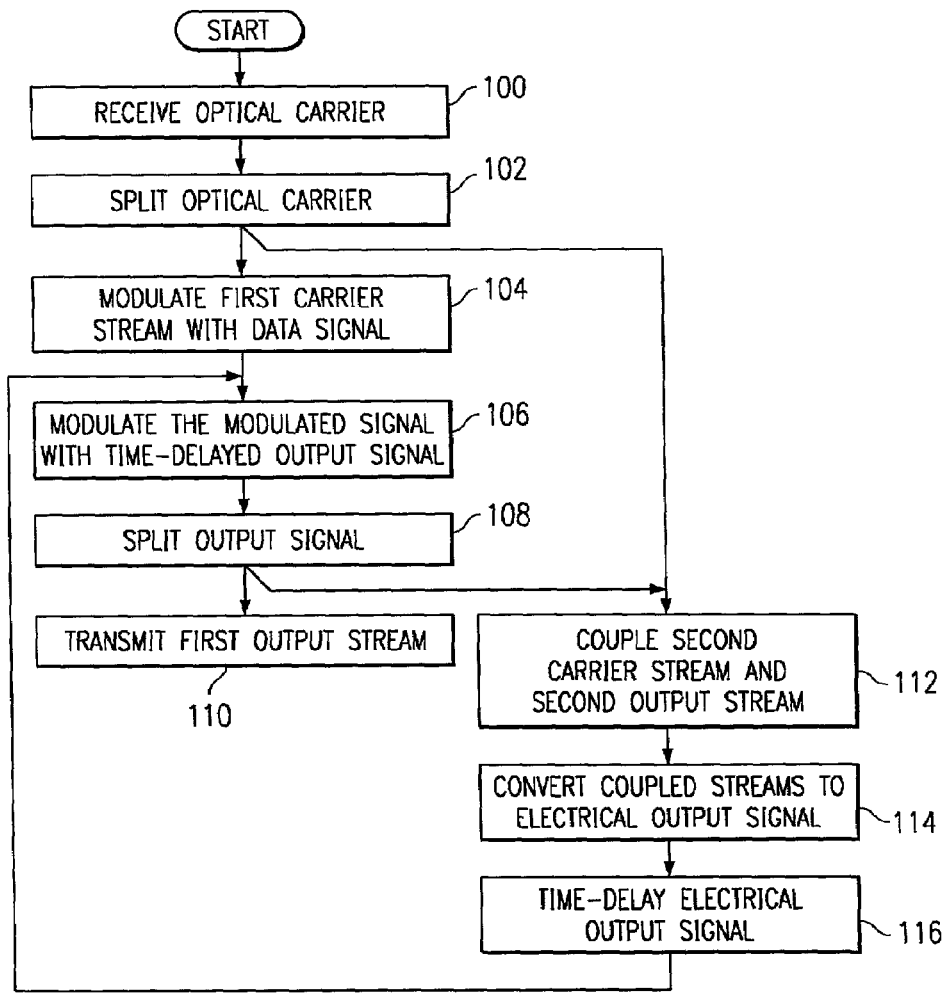

OPTICAL PHASE MODULATION

TECHNICAL FIELD OF THE INVENTION

The present invention relates generally to optical communication networks and, more particularly, to high data rate optical phase modulation.

BACKGROUND OF THE INVENTION

To meet the ever-increasing demands for bandwidth in communication networks, many service providers choose to increase data transmission rates. This squeezes more capacity out of existing infrastructure, however, broadband signals used in high data rate transmissions can prove difficult to effectively process. Specifically, in optical networks using phase shift keying modulation, broadband signals may disrupt conventional precoding and postcoding of electrical data signals.

SUMMARY OF THE INVENTION

In accordance with the present invention, techniques for high data rate optical phase modulation are provided.

According to one embodiment of the present invention, an optical modulator includes a first phase modulator that phase modulates an optical carrier signal according to a first data stream to generate a modulated optical signal. The optical modulator further includes a second phase modulator that phase modulates the modulated optical signal according to a second data signal to generate an optical data signal, wherein the second data stream comprises a time-delayed version of the optical data signal.

According to another embodiment of the present invention, an optical modulator includes multiple electrical preceding modules. Each of the precoding modules receives a data stream and precodes the data stream. The optical modulator further includes multiple phase modulators linked in series. Each of the phase modulators receives the precoded data stream from a corresponding one of the preceding modules, receives an optical signal from a preceding one of the phase modulators in the series, and modulates the received optical signal according to the precoded data stream from the corresponding preceding module.

Embodiments of the invention provide various technical advantages. The disclosed techniques provide a number of embodiments for precoding of data signals transmitted on an optical line. More specifically, these techniques permit precoding of data transmitted in phase modulated optical data signals. This preceding permits direct detection of optical data signals at optical receivers. This can reduce complexity and cost of optical receivers. Moreover, the precoding of the data signals can reduce the effects of errors in transmission along an optical fiber. For example, the precoding may prevent an error in one transmitted bit from propagating along the bit stream to cause errors in receiving subsequently transmitted bits.

According to particular embodiments, precoding may occur during modulation of optical signals, thus reducing the need for electrical components. This reduction in electrical components can reduce susceptibility to high frequency disruptions, thus permitting higher data rate transmissions compared to many conventional systems. According to other embodiments, a modulator precodes a number of relatively low data rata electrical data streams and combines these precoded electrical data streams using a series of phase modulators to generate a single precoded high data rate optical data stream. These techniques permit precoding of electrical data streams at frequencies tolerable to electrical components.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 is a block diagram illustrating exemplary functional components of another embodiment of the optical modulator;

FIG. 4 is a flowchart illustrating a method for generating a precoded optical signal using a particular embodiment of the optical modulator.

DETAILED DESCRIPTION OF THE DRAWINGS

Figure 1:
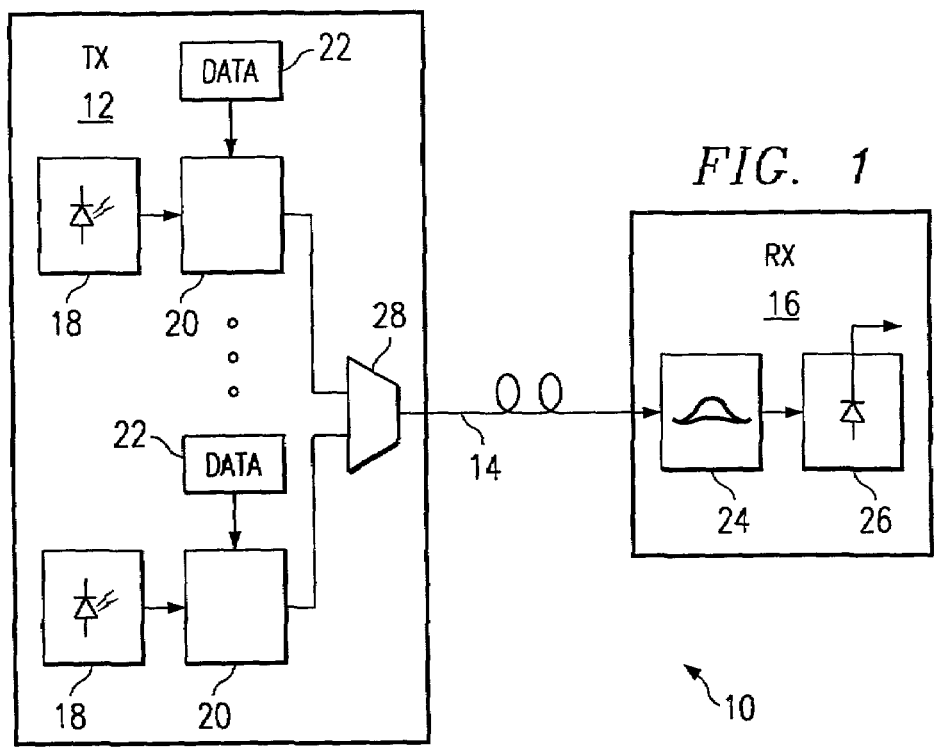
FIG. 1 illustrates an optical communication system having an optical modulator in accordance with various embodiments of the present invention.

FIG. 1 illustrates an optical communication system, indicated generally at 10, that includes a transmission module 12 coupled across one or more spans of optical fibers 14 to a receiver 16. Transmission module 12 includes a light source 18 for generating an optical carrier and an optical modulator 20 for modulating data from a data source 22 to generate a phase modulated optical data signal. In general, transmission module 12 generates precoded optical data signals for communicating information on optical fiber 14 by passing an optical carrier generated by light source 18 through optical modulator 20. According to particular embodiments, optical modulator 20 precodes the optical data signal using feedback from the optical data signal. According to alternative embodiments, optical modulator 20 electrically precodes multiple data streams and combines the precoded data steams to generate a single higher data rate precoded optical data signal.

Transmission module 12 represents any suitable collection and arrangement of hardware, including any appropriate logic, for generating and transmitting optical signals on optical fiber 14. While illustrated in a relatively simple embodiment, system 10 contemplates transmission module 12 having any appropriate elements for communicating information on optical fiber 14. For example, the embodiment illustrated includes multiple sets of optical signal generating components (light source 18 and optical modulator 20), with signals from these elements multiplexed together by multiplexer 28 for transmission of multiple optical signals across optical fiber 14 at various wavelengths.

To generate optical data signals for communication to receiver 16, transmission module 12 includes light source 18, modulator 20, and data source 22. Light source 18 represents equipment, such as a laser, that generates an optical carrier signal. Data source 22 provides a stream of data, encoded in electrical signals, for transmission in optical signals to receiver 16. However, while the embodiment illustrated includes data source 22 within transmission module 12, system 10 contemplates transmission module 12 receiving one or more data streams from internal and/or external data sources. Thus, for example, transmission module 12 may receiver four, ten gigabit data streams for combination and transmission as a single forty gigabit optical signal on optical fiber 14.

Modulator 20 phase modulates an optical carrier signal generated by light source 18 according to the data stream from data source 22 to generate a phase modulated optical data signal for communication to receiver 16. More specifically, modulator 20 may modulate the optical carrier signal using phase shift keying (PSK) modulation and additionally precode the information communicated in the phase modulated optical signal, thus permitting direct detection of the information in the optical data signal by receiver 16.

Receiver 16 represents any suitable combination and arrangement of hardware, including any appropriate logic, for receiving, separating, and decoding optical signals received on optical fiber 14. In the embodiment illustrated, receiver 16 includes a phase to intensity conversion module 24 and a photo detector 26. Conversion module 24 receives a phase modulated optical signal on fiber 14 and converts the phase modulated optical signal into an intensity modulated optical signal. For example, in a phase modulated optical signal encoding binary information, a value of "0" may be represented with a phase shift of 0 degrees while a value of "1" may be represented with a phase shift of 180 degrees. In an intensity modulated optical signal, a value of "0" may be represented with the absence of a light pulse, while a value of "1" may be represented with the presence of a light pulse.

To convert a phase modulated optical signal into an intensity modulated optical signal, conversion module 24 splits the received optical signal, delays one stream of the split optical signal, and interferes the delayed stream with the non-delayed stream of the received optical signal. According to particular embodiments, conversion module 24 is implemented using a Mach-Zehnder interferometer having arm lengths appropriately configured. Given an appropriate delay along one path of the split optical signal, the interference when the two streams recombine converts the phase modulated optical signal into an intensity modulated optical signal. Photo detector 26 may then convert the intensity modulated optical signal into an electrical data signal.

Because conversion module 24 interferes a time delayed version of the received optical signal with the received optical signal, the output of conversion module 24 will not provide the straight conversion of the phase modulated signal received into intensity format. For example, given a time delay of one bit period between the two streams of the received optical signal, the output of conversion module 24 represents the exclusive or (XOR) of consecutive bits in the bit stream. Thus, if the transmitted bit sequence from transmission module 12 is given as T=[t(0),t(1),t(2) . . . t(n)], then the output R of conversion module 24 is:

$$r(0) = t(0) \oplus 0$$

$$r(1) = t(1) \oplus t(0)$$

$$r(2) = t(2) \oplus t(1)$$

$$\vdots$$

$$r(n) = t(n) \oplus t(n-1).$$

To compensate for the variation between the output of conversion module 24 and the phase modulated signal communicated by transmission module 12, transmission module 12 precodes the bit stream communicated in the optical data signal. This preceding within transmission module 12 compensates for the exclusive or (XOR) operation resulting from the design of conversion module 24. Given the previous example with a time delay of one bit period, transmission module 12 may compensate for the exclusive or (XOR) performed upon consecutive bits received by receiver 16 through preceding. Let B represent the original bit sequence from data source 22. The transmitted bit sequence, T, is then determined as:

$$t(0) = b(0) \oplus 0$$

$$t(1) = b(1) \oplus t(0)$$

$$t(2) = b(2) \oplus t(1)$$

$$\vdots$$

$$t(n) = b(n) \oplus t(n-1).$$

Given the preceding of data from data source 22 according to this formula, the output of conversion module 24, and subsequently the electrical data stream generated by photo detector 26, will equal the original bit sequence, B, from data source 22.

Within transmission module 12, modulator 20 performs precoding of the data stream received from data source 22. According to particular embodiments, modulator 20 performs precoding of the data stream using feedback from the optical data signal generated by modulator 20. The operation of modulator 20 according to a particular one of these embodiments is described in greater detail with respect to FIG. 2 below. According to other embodiments, modulator 20 performs precoding by electrically precoding several data streams and then combining these precoded streams into a single higher data rate optical data stream. The operation of modulator 20 according to a particular one of these embodiments is described in greater detail with respect to FIG. 3 below.

Figure 2:
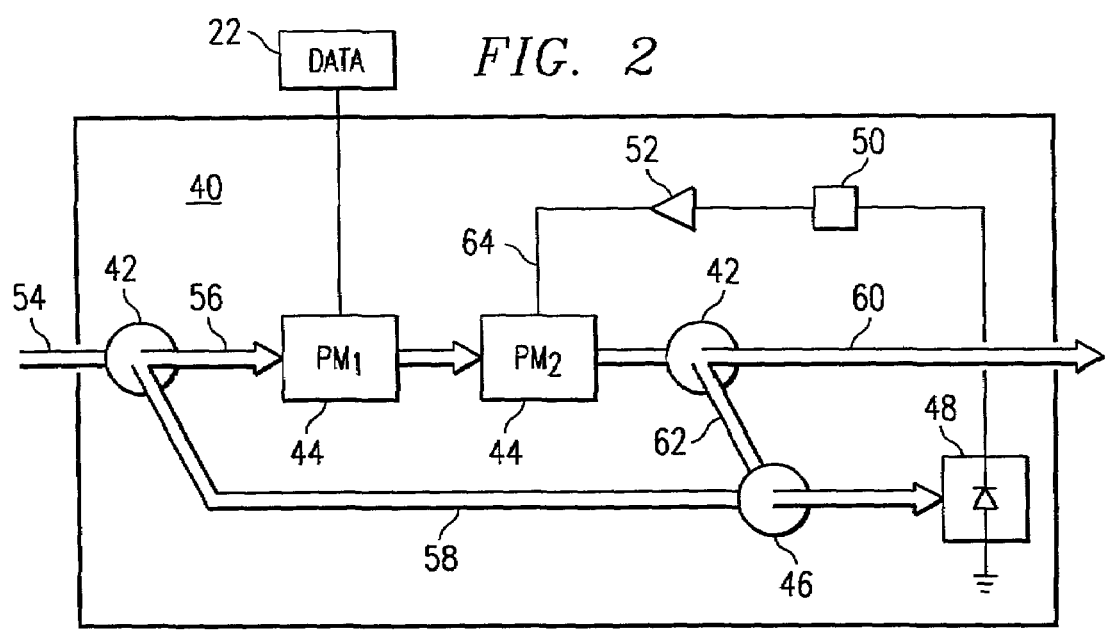
FIG. 2 is a block diagram illustrating exemplary functional components for a particular embodiment of the optical modulator.

FIG. 2 is a block diagram of an optical modulator 40 illustrating a particular embodiment for implementing optical modulator 20 of transmission module 12. In the embodiment illustrated, modulator 40 includes optical splitters 42, phase modulators 44, an optical coupler 46, a photo detector 48, a tunable delay module 50, and a driver amplifier 52. In general, modulator 40 precodes information communicated in a phase modulated optical data signal using feedback generated from the optical data signal.

In the embodiment illustrated, light paths are represented using broad lines, while electrical paths are represented using thinner lines. Thus, a light path enter modulator 40 and is split into two streams 56 and 58 by splitter 42. One of these streams of light stream 56, passes through a first phase modulator 44 ($PM_1$), through a second phase modulator 44 ($PM_2$), and into a second splitter 42. The second splitter 42 splits the received light into two streams 60 and 62. Modulator 40 outputs stream 60 as the phase modulated optical data signal. The other stream from the second splitter 42, stream 62 is merged with the other stream from the first splitter 42, stream 58, using coupler 46.

Splitters 42 represents optical elements for splitting light into multiple streams. Similarly, coupler 46 represents an optical element for combining multiple received light streams into a single light stream. According to particular embodiments, splitters 42 are configured to deliver streams of light having substantially equivalent power to coupler 46. This ensures optimal performance of coupler 46, thus delivering a "clean" signal to photo detector 48. To deliver substantially equal power on paths 58 and 62, the splitting ratios of splitters 42 should be appropriately calibrated. For example, assume a splitting ratio of the first splitter 42 of 1:x. Given this splitting ratio, if a stream of light on path 58 has a power of 1, the corresponding split stream of light on path 56 will have a power of x. Now assume a splitting ratio of 1:y for the second splitter 42. The values for x and y may be calculated using the formula x=1+y. Configuring the splitting ratios of splitters 42 according to this formula can ensure that optical signals having substantially equal power will be delivered to coupler 46 along paths 58 and 62. However, system 10 contemplates modulator 40 including any appropriate equipment calibrated and/or configured to split and couple light paths.

Phase modulators 44 receive optical signals and modulate received optical signals according to electrical data input. For example, $PM_1$ receives an optical carrier signal on path 56 and modulates the received carrier according to an electrical data signal received from data source 22. Similarly, $PM_2$ receives an optical signal from $PM_1$ and modulates the received signal according to an electrical signal received on a feedback line 64. According to particular embodiments, modulation of optical signals within phase modulators 44 takes place using PSK modulation. That is, phase modulators 44 shift the phase of an optical signal based upon a received electrical signal. Thus, binary electrical data dictates phase shifting of an optical signal within phase modulator 44. For example, upon receiving an electrical signal indicating a value of "1", phase modulator 44 shifts the phase of an optical signal by 180 degrees. For a received value of "0", phase modulator 44 does not shift the phase of the optical signal (a phase shift of 0 degrees).

Modulator 40 also includes electrical and optoelectrical components, including photo detector 48, tunable delay module 50, and amplifier 52. Photo detector 48 represents any suitable element or elements for converting a received optical signal into a corresponding electrical signal. For example, upon detecting the presence of light received from coupler 46, photo detector 48 may generate an electrical signal indicating a binary value of "1". Similarly, given the absence of light received from coupler 46, photo detector 48 may generate an electrical signal indicating a binary value of "0".

Tunable delay module 50 represents any suitable elements for selectably delaying an electrical signal from photo detector 48. For example, using tunable delay module 50, modulator 40 may configure the time that it takes an electrical signal from photo detector 48 to reach $PM_2$. This permits tuning of the delay along line 64 such that the delay equals an integer multiple of bit-periods in the optical communication stream. For example, according to particular embodiments, the delay along line 64 is substantially equal to one bit period. This results in $PM_2$ modulating the received optical signal with its own output delayed by the duration of a single bit. This delay along feedback line 64 may be set to any appropriate integer multiple of bit-periods. However, at receiver 16, converter 24 should be configured to match the delay used in modulator 40. For example, given a delay of three bit periods along feedback line 64, converter 24 in receiver 16 should use the same delay.

In operation, modulator 40 receives an optical carrier signal on path 54 from light source 18. The first splitter 42 splits the optical carrier onto path 56 and path 58 according to its configured splitting ratio. $PM_1$ receives the optical carrier on path 56 and modulates the optical carrier according to a data stream received from data source 22. $PM_1$ communicates this modulated optical signal to $PM_2$. $PM_2$ modulates the modulated optical signal according to the data stream received on line 64 to generate an optical data signal for output by modulator 40. As previously discussed, the data stream on feedback line 64 represents a time delayed version of the optical data signal generated by $PM_2$.

To obtain feedback from the generated optical data signal, modulator 40 taps the optical data signal using splitter 42. Thus, splitter 42 splits the optical data signal onto path 60 and path 62, with path 60 used as an output of modulator 40 and path 62 used for feedback. The tapped optical data signal on path 62 and the split optical carrier signal on path 58 interfere within coupler 46 to generate an intensity modulated version of the optical data signal. Thus, while the optical data signal generated by $PM_2$ is phase modulated, the output resulting from coupler 46 is intensity modulated. This intensity modulated signal simplifies the operation of photo detector 48, since, in an intensity modulated signal, the presence of light indicates a binary on while the absence of light indicates a binary off.

Photo detector 48 converts the intensity modulated optical signal received from coupler 46 into an electrical data stream. This electrical data stream is delivered along feedback line 64, through tunable delay module 50 and amplifier 52, as the electrical data stream for phase modulation within $PM_2$. This results in precoding of the optical data signal generated by modulator 40, thus permitting direct detection of the optical data signal by receiver 16.

However, while the embodiment illustrated and the preceding description focus on a particular embodiment of modulator 40 that includes specific elements, system 10 contemplates modulator 40 having any suitable combination and arrangement of elements for preceding an optical data signal using time delayed feedback of the optical data signal. For example, while the embodiment illustrated uses tunable delay module 50 to moderate the delay along feedback line 64, the length of feedback line 64 may be designed such that inherent delay is equal to an integer multiple of the bit period of bits within the optical data signal, thus obviating the need for tunable delay module 50. Moreover, system 10 contemplates modulator 40 using any appropriate optical technology, such as planar lightwave circuits, discreet coupled elements, free space optics, and/or other suitable optical technologies.

FIG. 3 is a block diagram of an optical modulator 80 illustrating a particular embodiment for implementing modulator 20 of transmission module 12. In the embodiment illustrated, modulator 80 includes a deinterlace module 82, preceding modules 84, a delay module 86, and phase modulators 88. In general, modulator 80 generates a phase modulated optical data signal having a precoded data stream. To generate the precoded optical data signal, modulator 80 electrically precodes multiple data streams and interlaces these precoded data streams using phase modulators 88.

As in the illustration of modulator 40, the broad lines within modulator 80 represent light paths, while the thinner lines represent electrical paths. In addition, phase modulators 88 ($PM_1$ and $PM_2$) operate similarly to phase modulators 44 of modulator 40.

The electrical components within modulator 80 perform precoding of two or more data streams for combination into a single higher data rate optical data signal. In the embodiment illustrated, these components include deinterlace module 82, a first precoder 84 ($PC_1$), a second precoder module 84 ($PC_2$), and delay module 86. Deinterlace module 82 receives a single high data rate bit stream and converts the bit stream into two or more lower data rate bit streams. In the embodiment illustrated, deinterlace module 82 converts the bit stream received from data source 22 into two bit streams. To split the bit stream, deinterlace module 82 delivers each consecutive bit to a different one of $PC_1$ and $PC_2$. Thus, for example, deinterlace module 82 may deliver the first received bit to $PC_1$, the second received bit to $PC_2$, the third received bit to $PC_1$, etc. This results in two bit streams each having half the data rate of the original bit stream received from data source 22. For example, given a bit stream from data source 22 having a rate of forty gigabits per second, deinterlace module 82 delivers bit streams having data rates of twenty gigabits per seconds to each of $PC_1$ and $PC_2$.

Precoding modules 84 represent any suitable elements for precoding electrical data signals. FIG. 3 expands upon $PC_2$ to illustrate a particular embodiment implementing precoding module 84 using an exclusive or gate 90 and D flip flops 92. This configuration precodes the received electrical signal according to the precoding formula discussed above.

To ensure that the two bit streams from $PC_1$ and $PC_2$ are appropriately interlaced into an optical data signal, the output of $PC_2$ may pass through delay module 86. According to the embodiment illustrated, delay module 86 delays the bit stream received from $PC_2$ the duration of the bit period of the combined data streams. For example, if $PC_1$ and $PC_2$ each operate on twenty gigabit per second data streams, the delay period of delay module 86 is equal to the bit period of a forty gigabit per second data stream.

Thus, in operation, modulator 80 performs electrical precoding of multiple data streams and then phase modulates each of these precoded data streams into a single optical data signal. This generates an optical data signal having a data rate equal to the sum of the data rates from the multiple precoded electrical data streams. Using these techniques, electrical precoding of data signals occurs at lower data rates compared to the resulting optical data rate, thus preventing problems that may occur within electrical components operating at high data rates.

While the embodiment illustrated and the preceding description of modulator 80 focus on a particular embodiment that includes specific elements, system 10 contemplates modulator 80 having any suitable combination and arrangement of elements for electrically precoding multiple electrical data streams and phase modulating these streams into a single optical signal. Thus, for example, while modulator 80 is illustrated as having two precoders 84 operating on two data streams, modulator 80 may have any suitable number of precoders 84 with corresponding phase modulators 88 to combine any number of data streams. Moreover, system 10 contemplates modulator 80 using any appropriate optical technology, such as planar lightwave circuits, discreet coupled elements, free space optics, and/or other suitable optical technologies.

FIG. 4 is a flowchart illustrating a method, performed by modulator 40, to generate a precoded optical data signal using feedback from the optical data signal. Modulator 40 receives an optical carrier signal at step 100 and splits the optical carrier signal at step 102. For example, within modulator 40, splitter 42 may split a received optical carrier signal onto two light paths, path 56 and path 58.

Modulator 40 phase modulates the first optical carrier stream with a data signal at step 104. For example, within modulator 40, $PM_1$ modulates the optical carrier signal received on path 56 according to an electrical data stream received from data source 22. Modulator 40 then modulates the modulated optical signal again, this time according to the time delayed output signal at step 106. For example, $PM_2$ receives the modulated optical signal from $PM_1$ and phase modulates the received signal according to an electrical signal received along feedback line 64. This generates a precoded, phase modulated optical signal. Modulator 40 splits the generated optical data signal at step 108 and transmits the first stream of the split optical data signal as output at step 110. Modulator 40 couples the second stream of the optical data signal and the second stream of the optical carrier signal at step 112. For example, the tapped optical data signal on path 62 may interfere with the split optical carrier signal on path 58 within coupler 46. As previously discussed, this produces an intensity modulated optical data signal. Modulator 40 converts the coupled streams to an electrical output signal at step 114 and time delays the electrical output signal at step 116. As discussed above, this delay ensures that the data stream provided to the second phase modulator is delayed for a duration equal to an integer multiple of bit periods.

Figure 5:
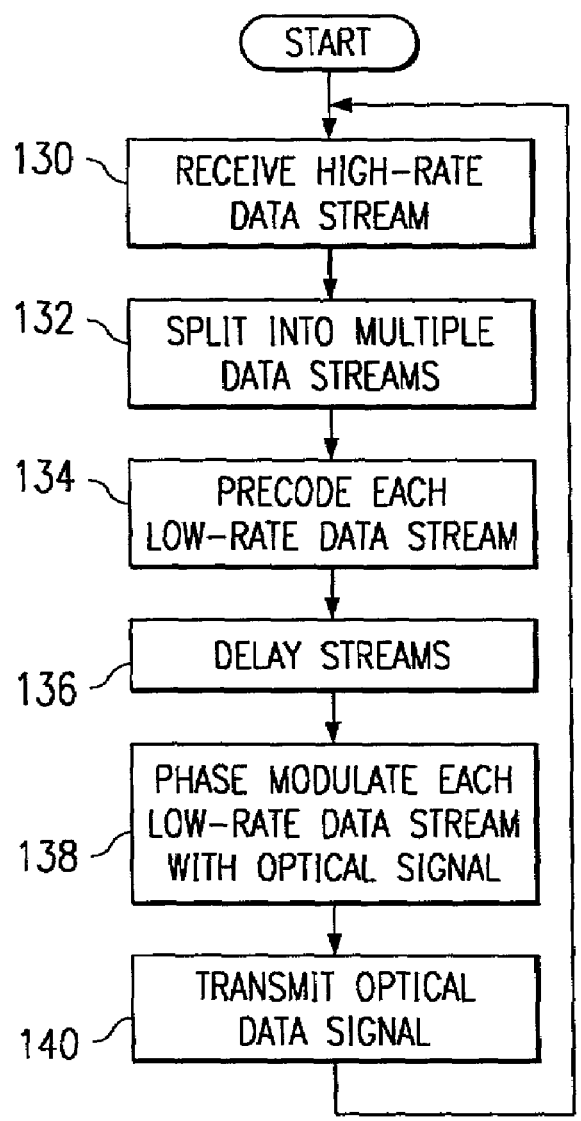
FIG. 5 is a flowchart illustrating a method for generating a precoded optical signal using an alternative embodiment of the optical modulator.

FIG. 5 is a flowchart illustrating a method performed by modulator 80 for generating a precoded optical data signal by electrically preceding multiple data streams and combining these data streams to provide a single higher data rate optical data signal. Modulator 80 receives a high rate electrical data stream at step 130 and splits the high rate data stream into multiple data streams at step 132. For example, as illustrated in modulator 80, deinterlace module 82 may split a received data stream into multiple data streams. Modulator 80 precodes each lower rate data stream at step 134. Modulator 80 delays one or more of the low rate data streams at step 136. As previously discussed, the delay provides for appropriate interlacing of the multiple low rate data streams in the series of phase modulators. The series of phase modulators phase modulate each low rate data stream with an optical signal at step 138. This generates a single optical data signal encoding the original high rate data stream in precoded format. Modulator 80 transmits the generated optical data signal at step 140.

The preceding flowcharts illustrate only exemplary methods of operation, and system 10 contemplates modulators using any suitable techniques and elements for generating precoded optical data signals according to various embodiments. Thus, many of the steps in these flowcharts may take place simultaneously and/or in different orders than as shown. In addition, modulators may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. An optical modulator comprising:
a first phase modulator operable to phase modulate an optical carrier signal according to a first data stream to generate a modulated optical signal; and
a second phase modulator operable to phase modulate the modulated optical signal according to a second data stream to generate an optical data signal, wherein the second data stream comprises a time-delayed version of the optical data signal.

2. The optical modulator of claim 1, wherein the second data stream comprises a version of the optical data signal having a one bit-period delay.

3. The optical modulator of claim 1, further comprising a converter operable to convert the optical data signal into an intensity modulated optical data signal; and
a photodetector operable to convert the intensity modulated optical data signal into an electrical data stream, the electrical data stream delivered to the second phase modulator as the time-delayed version of the optical data signal.

4. The optical modulator of claim 1, further comprising:
a first optical splitter coupled to the first phase modulator and operable to split a received optical carrier signal into the optical carrier signal for the first phase modulator and a second optical carrier stream;
a second optical splitter coupled to the second phase modulator and operable to split the optical data signal from the second phase modulator into a first optical data stream and a second optical data stream;
an optical coupler coupled to receive input from the first splitter and the second splitter, the optical coupler operable to interfere the second optical data stream and the second optical carrier stream to generate an intensity modulated optical data signal; and
a photodetector operable to convert the intensity modulated optical data signal into an electrical data stream, the electrical data stream delivered to the second phase modulator as the time-delayed version of the optical data signal.

5. The optical modulator of claim 4, wherein a splitting ratio of the first splitter and a splitting ratio of the second splitter are configured such that a power of the second optical carrier stream and a power of the second optical data stream are substantially equal.

6. The optical modulator of claim 1, further comprising a tunable delay module operable to selectively control delay of the time-delayed version of the optical data signal.

7. The optical modulator of claim 1, wherein an electrical feedback line delivering the second data stream to the second phase modulator is configured to provide an electrical version of the optical data signal having a one bit-period delay.

8. The optical modulator of claim 1, wherein the first data stream and the second data stream each comprise electrical data signals.

9. A method for precoding optical data signals comprising:
receiving an optical carrier signal;
receiving a first electrical data steam;
phase modulating the optical carrier signal according to the electrical data stream to generate a modulated optical signal;
phase modulating the modulated optical signal according to a second electrical data stream to generate an optical data signal, wherein the second electrical data stream comprises a time-delayed version of the optical data signal.

10. The method of claim 9, wherein the second electrical data stream comprises a version of the optical data signal having a one bit-period delay.

11. The method of claim 9, further comprising
converting the optical data signal into an intensity modulated optical data signal; and
converting the intensity modulated optical data signal into the second electrical data stream; and
delaying the second electrical data stream such that the second electrical data stream is delivered to the second phase modulator as the time-delayed version of the optical data signal.

12. An optical modulator comprising:
a first optical splitter having an optical input, a first optical output, and a second optical output;
a first phase modulator having an optical input, an optical output, and an electrical data input, the optical input coupled to the first optical output of the first optical splitter;
a second phase modulator having an optical input, an optical output, and an electrical data input, the optical input coupled to the optical output of the first phase modulator;
a second optical splitter having an optical input, a first optical output, and a second optical output, the optical input coupled to the optical output of the second phase modulator;
an optical coupler having a first optical input, a second optical input, and an optical output, the first optical input coupled to the optical output of the first optical splitter, and the second optical input coupled to the optical output of the second optical splitter; and
a photodetector having an optical input and an eletrical output, the optical input coupled to the optical output of the optical coupler, and the electrical output coupled to the electrical data input of the second phase modulator.

13. An optical modulator comprising:
means for receiving an optical carrier signal;
means for receiving a first electrical data steam;
means for phase modulating the optical carrier signal according to the electrical data stream to generate a modulated optical signal;
means for phase modulating the modulated optical signal according to a second electrical data stream to generate an optical data signal, wherein the second electrical data stream comprises a time-delayed version of the optical data signal.

* * * * *

UNITED STATES PATENT AND TRADEMARK OFFICE
CERTIFICATE OF CORRECTION

PATENT NO. : 6,990,296 B2  
APPLICATION NO. : 10/028658  
DATED : January 24, 2006  
INVENTOR(S) : Choudhary et al.

Page 1 of 1

It is certified that error appears in the above-identified patent and that said Letters Patent is hereby corrected as shown below:

Title Page, (57) Abstract, Line 1, after "for", delete "preceding", and insert -- precoding --.
Column 1, Line 18, after "conventional", delete "preceding", and insert -- precoding --.
Column 1, Lines 35-36, after "electrical", delete "preceding", and insert -- precoding --.
Column 1, Lines 40-41, after "of the", delete "preceding", and insert -- precoding --.
Column 1, Line 44, after "corresponding", delete "preceding", and insert -- precoding --.
Column 1, Line 50, after "This", delete "preceding", and insert -- precoding --.

Signed and Sealed this

Thirtieth Day of January, 2007

JON W. DUDAS  
*Director of the United States Patent and Trademark Office*